(12) United States Patent
Sharma

(10) Patent No.: US 7,769,048 B2
(45) Date of Patent: Aug. 3, 2010

(54) LINK AND LANE LEVEL PACKETIZATION SCHEME OF ENCODING IN SERIAL LINKS

(75) Inventor: Debendra Das Sharma, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 12/145,696

(22) Filed: Jun. 25, 2008

(65) Prior Publication Data

US 2009/0323722 A1  Dec. 31, 2009

(51) Int. Cl.
*H04J 3/00* (2006.01)
*G06F 11/00* (2006.01)
*H04N 11/02* (2006.01)

(52) U.S. Cl. ............. 370/474; 375/240.27; 713/52

(58) Field of Classification Search ............... None
See application file for complete search history.

(56) References Cited

U.S. PATENT DOCUMENTS

| 6,628,725 | B1 * | 9/2003 | Adam et al. ............. 375/259 |
| 6,980,616 | B1 * | 12/2005 | Nakano et al. ............. 375/364 |
| 7,296,211 | B2 * | 11/2007 | Cole et al. ............. 714/776 |
| 7,508,800 | B1 * | 3/2009 | Deng ............. 370/338 |
| 2002/0009089 | A1 * | 1/2002 | McWilliams ............. 370/401 |
| 2007/0180281 | A1 * | 8/2007 | Partovi et al. ............. 713/320 |
| 2009/0041099 | A1 * | 2/2009 | Das Sharma et al. ........ 375/220 |

* cited by examiner

*Primary Examiner*—Chi H Pham
*Assistant Examiner*—Soon-Dong D Hyun
(74) *Attorney, Agent, or Firm*—Carrie A. Boone, P.C.

(57) ABSTRACT

A novel encoding scheme is disclosed, enabling the physical layer to identify packet boundaries by looking at a few selected bits while improving the error detection capability and maintaining low overhead for low power states. By eliminating the overhead of 8b/10b encoding for the physical layer, the encoding scheme achieves better error detection ability than current 8b/10b encoding. Further, the novel encoding scheme provides additional error detection capability, a low overhead mechanism to exit low power states, and a mechanism to handle problematic packets.

18 Claims, 7 Drawing Sheets

Figure 4 transaction layer packet layout (36)

CRC[3:0] = degree 12 polynomial of {Length[9:0], TD, Fmt[1,0]} mod CRC polynomial END = byte-wise XOR of bytes 1 through (n/8 - 1)

EDB = byte-wise XNOR of bytes 1 through (n/8 - 1)

LINK AND LANE LEVEL PACKETIZATION SCHEME OF ENCODING IN SERIAL LINKS

TECHNICAL FIELD

This application relates to encoding in serial links and, more particularly, to an improvement over the 8b/10b encoding scheme.

BACKGROUND

Some serial interconnects, such as Peripheral Component Interconnect (PCI) express (PCIe), use an 8b/10b encoding scheme, which uses ten bits on the wire to represent eight bits of meaningful data. The 8b/10b encoding scheme is designed to ensure a sufficient 1-to-0 and 0-to-1 transition density such that the receiver can clock the inbound packet. That is a loss of 20% in bandwidth, due to encoding, and a 25% loss in transmission performance.

In addition to encoding the $2^8$ possible data patterns for both positive and negative disparities, the 10-bit encodings cover some control characters (also known as K-codes) that are used for various purposes, such as determining framing boundaries. These can be broadly categorized as packet delineating K-codes and lane stream K-codes. Packet delineating K-codes denote the start or end of a packet (e.g., STP, SDP, END, EDB). On the other hand, lane stream K-codes are used independently on a per-lane basis and are used for ordered sets used during link training (training sets TS1/TS2), electrical idle entry/exit sequences (EIOS and EIES, respectively), or the periodic skipped characters (SKP) ordered sets used for tolerating parts per million (ppm) differences in the distinct clock mode. One of the lane stream K-codes (COM) is used to uniquely identify the byte alignment and is used to recover from errors such as bit slip or add. In addition to guaranteeing eventual recovery from multiple bit errors, including loss of byte alignment due to errors such as bit slip/adds, 8b/10b enables a guaranteed detection against any single bit flip error (in conjunction with CRC).

As serial link-based implementations become ubiquitous, and the frequency of those implementations continues to increase, efficient encodings become critical to extracting the most of the raw bandwidth.

Replacing 8b/10b encoding is not without risks. The challenges in the reliability of a new scheme would need to be solved. Any new scheme must be able to guarantee the existing error model, which guarantees some predetermined number of bit flip error detection and eventual recovery from other error types (including multiple bit errors, bit slips, etc.).

In addition, as the frequency increases (e.g., PCIe 3.0 at 8 GT/s), there may be other error types that need to be addressed with any new encoding scheme. For example, receiver designs that use Decision Feedback Equalizers (DFEs) should be considered. DFEs may see a single bit flip corrupt subsequent bits depending on the bit pattern. Even existing 8b/10b schemes may not be able to detect these types of errors. Thus, in addition to preserving the existing fault model, it would be highly desirable to tolerate multiple bit errors within a sliding window of bits in any lane.

For serial links that have attributes of both serial and parallel links (such as PCIe where data bytes are striped across multiple lanes in a multi-lane link), existing solutions such as 64/66 do not work. The proposed scheme addresses some of these issues.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a novel encoding scheme is disclosed, enabling the physical layer to identify packet boundaries by looking at a few selected bits while improving the error detection capability and maintaining low overhead for low power states. By eliminating the overhead of 8b/10b encoding for the physical layer, the encoding scheme achieves better error detection ability than current 8b/10b encoding. Further, the novel encoding scheme provides additional error detection capability, a low overhead mechanism to exit low power states, and a mechanism to handle problematic packets.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. For example, the embodiments described herein refer to PCI Express. However, the underlying disclosed techniques may be extended to any serial link. The following detailed description is, therefore, not to be construed in a limiting sense, as the scope of the present invention is defined by the claims.

Figure 1:
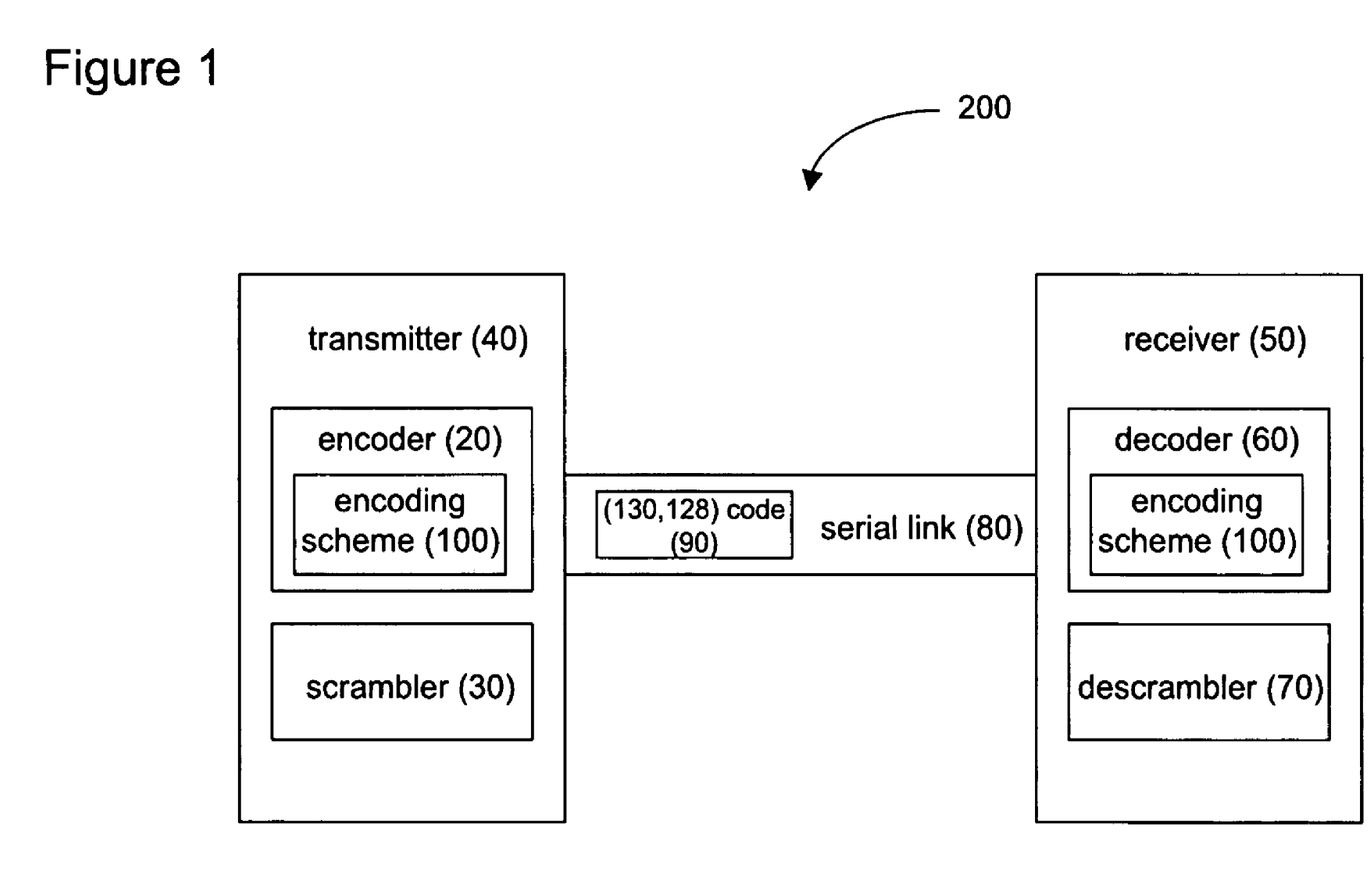
FIG. 1 is a block diagram of a system using an encoding scheme, according to some embodiments.

FIG. 1 is a schematic block diagram of a system 200 employing an encoding scheme 100, according to some embodiments. The system 200 includes a transmitter 40 and a receiver 50, communicating across a serial link 80. The serial link 80 may be a wired or wireless connection between the transmitter 40 and the receiver 50, and may include one or more lanes. The encoder 100 employs a (130, 128) code 90, which is further explained, below. The transmitter 40 includes an encoder 20, which executes the disclosed encoding scheme 100, and a scrambler 30. The receiver 50 includes a decoder 60, which also executes the encoding scheme 100, and a descrambler 70. The encoding scheme 100 replaces the well-known 8b/10b encoding scheme of the prior art.

The disclosed encoding scheme 100 uses various techniques to improve the error detection capability and to get around killer packets, and utilizes a mix of scrambled and unscrambled symbols for various parts of link training to achieve better reliability. By replacing the 8b/10b encoding, the encoding scheme 100 increases the effective bandwidth of the serial link 80, in some embodiments. Not only does this increase performance over current 8b/10b encoding schemes, but the encoding scheme 100 results in a power reduction, because the power is tied directly to the raw bit rate on the link. In addition to preserving the existing fault model, the proposed encoding scheme 100 tolerates multiple bit errors within a sliding window of bits in any lane.

In some embodiments, the encoding scheme 100 utilizes a (130, 128) type of code 90 to cover each lane of the serial link 80 for most cases. There may be exceptions in cases where a different encoding scheme may be used for better efficiency. For example, on exit from a low power state, the encoding scheme 100 may simply send raw bits to wake up the receiver, achieve bit lock and then do a lane-to-lane deskew prior to sending normal traffic in the (130, 128) format. Each of the functions (wake up receiver, bit lock, lane-to-lane deskew) can be achieved by sending unique patterns without paying the encoding overhead.

The (130, 128) code 90 is a variant of a prior art 64/66 code, but is used in a different way. In the encoder 20 (transmitter 40), the (130, 128) code 90 is transmitted across the link 80 so that the receiver 50 can identify the start of the incoming data. Thus, the decoder 60 (receiver 50) looks for the (130, 128) code 90 in the link 80. The (130, 128) code 90 is also used as a training sequence, allowing the transmitter 40 and the receiver 50 to synchronize themselves.

There are four broad types of payloads: transaction layer packets (TLPs), data link layer packets (DLLPs), idle (no packets) (IDLE), and ordered sets. TLPs have a variable length payload. DLLPs have a fixed length payload of eight bytes. IDLEs have a fixed length payload of one byte. Ordered sets have a variable length payload that is established per lane of the link 80. As is shown, below, in addition to optionally being a training sequence, the (130, 128) code 90 may be a logical IDL, a transaction layer packet (TLP), or a data link layer packet (DLLP).

Figure 2:
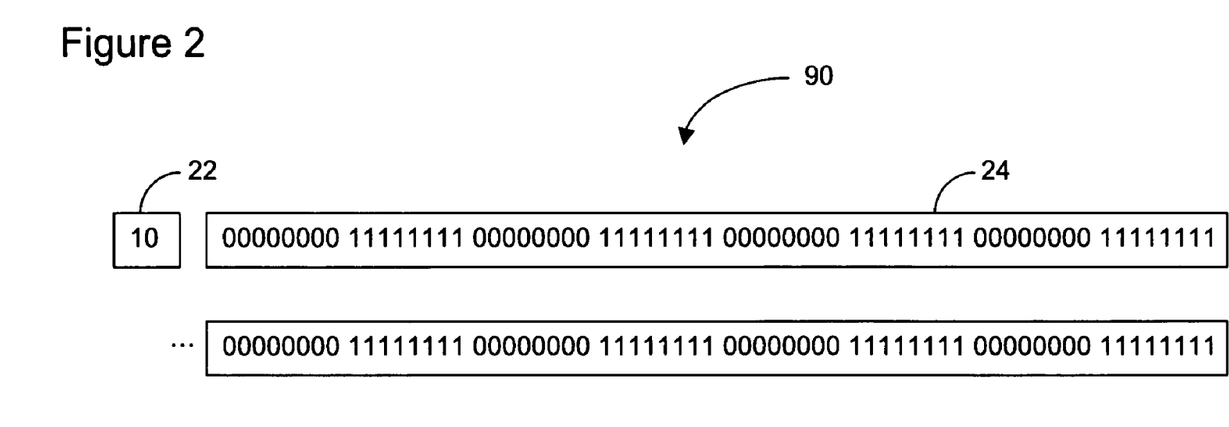
FIG. 2 is a block diagram of a (130, 128) code including a prefix and a 128-bit sequence used by the encoding scheme of FIG. 1, according to some embodiments.

The (130, 128) code 90 is depicted in FIG. 2, according to some embodiments. The first two bits 22, or sync header 22, of the (130, 128) code 90 are either 01 binary, 01b, or 10b (shown as "10b" in FIG. 2). The bit sequence "10b" is used as a prefix for some special packets or ordered sets in which the payload is not scrambled. One example is the electrical idle exit sequence (EIES) in PCIe, which operates using a low frequency content. In some embodiments, the 128-bit payload for EIES can be a sequence of eight zeros Subsequent to the first two bits 22 (01b or 10b), a sequence 24 of eight zeros, followed by eight ones, is repeated eight times, as shown.

Thus, the suggested encoding for the (130, 128) code 90 includes the two-bit prefix 22 and the 128-bit sequence 24 depicted in FIG. 2, according to some embodiments, for a total of 130 bits. The first two bits of the prefix 22 (either 01b or 10b) are not scrambled and the 128 bits of the sequence 24 are not scrambled, to preserve the low frequency pattern.

In some embodiments, the sequence 24 also serves a different purpose, since it is not scrambled. The sequence 24 is sent in a recovery state periodically, and thus is used to detect any bit slip or add type errors, resulting in a loss of byte alignment. The expectation is that if the receiver 50 is lost (for example, due to a loss of byte alignment), eventually, the link 80 goes to a recovery state. Either a cyclic redundancy check (CRC) (or other error protection scheme) fails, or some other framing error occurs (such as getting an invalid start of packet), or the other side does not get an expected acknowledgement, causing the link 80 to go to a recovery state to resynchronize. Once in the recovery state, the link expects to get certain types of training sequences. Each lane of the link 80 in the recovery state looks for a unique 130-bit pattern in the EIES. It can be proved that in the recovery state, with the limited number of training sequences possible, no amount of bit slip (without bit flips) will cause a non-EIES pattern (e.g., the sequence 24) to resemble an EIES pattern, due to the uniqueness of the EIES pattern.

The EIES can also be used to reset a linear feedback shift register (LFSR) of the scrambler 30 or the descrambler 70. Even though the encoding scheme 100 reuses the same EIES pattern for multiple purposes, those skilled in the art will recognize that the same effect can be achieved by having different unscrambled patterns for each of the objectives of low frequency pattern, obtaining block lock, and resetting the (de)scrambler.

When the (130, 128) code 90 comes with a prefix of 01b, other types of payload are sent, in some embodiments. Examples could include logical IDL transactions, and some different ordered sets than the ones sent with the 10b prefix. The 128-bit payload with this prefix may be scrambled. Within the 128-bit payload that is scrambled, the receiver 50 and transmitter 40 uniquely communicate the packet boundary as well as lane stream boundary, in some embodiments.

Figure 3:
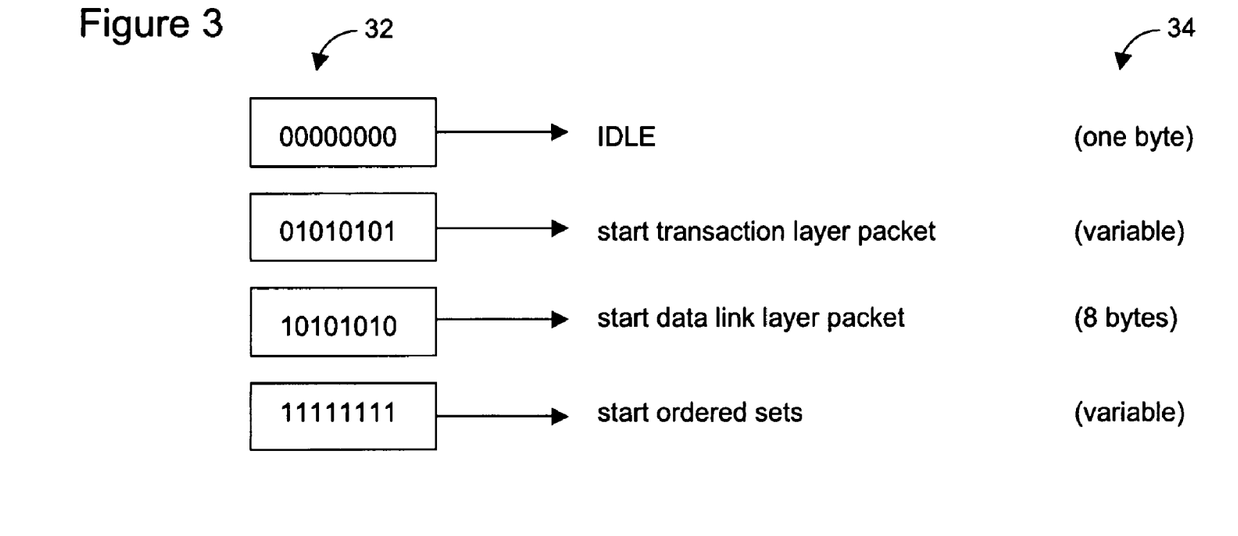
FIG. 3 is a block diagram of four payload types and their lengths processed by the encoding scheme of FIG. 1, according to some embodiments.

The encoder 100 utilizes a packetization scheme to delineate the packet boundary, in some embodiments. Packets may be defined as logical IDL, transactions, or ordered sets sent with the "01b" prefix in the (130, 128) code 90. The first (8-bit) symbol of the payload indicates which type of payload follows and helps point to where the next packet would begin. FIG. 3 indicates one possible encoding for the 8-bit payload type symbol 32, as well as the expected length 34, if known, of the payload. Other symbol sequences may be used, as long as a unique symbol is defined for each payload type. By looking at the first symbol of the payload, the receiver 50 figures out which type of payload is being transmitted.

If the receiver 50 obtains a send DLLP payload (SDP) or an IDLE payload in the payload type symbol 32, the payload length 34 is known apriori (eight bytes and one byte, respectively). On the other hand, if a send TLP payload (STP) is transmitted in the payload type symbol 32, the receiver 50 determines where the packet ends so that the first symbol of the next packet may be obtained. The ordered sets payload is not discussed herein. If the receiver gets anything other than these four payload types 32 in the first symbol, the receiver 50 reports an error and causes the link 80 to go to recovery, in some embodiments. This encoding scheme 100 results in guaranteed detection of errors of triple bit flips.

Figure 4:
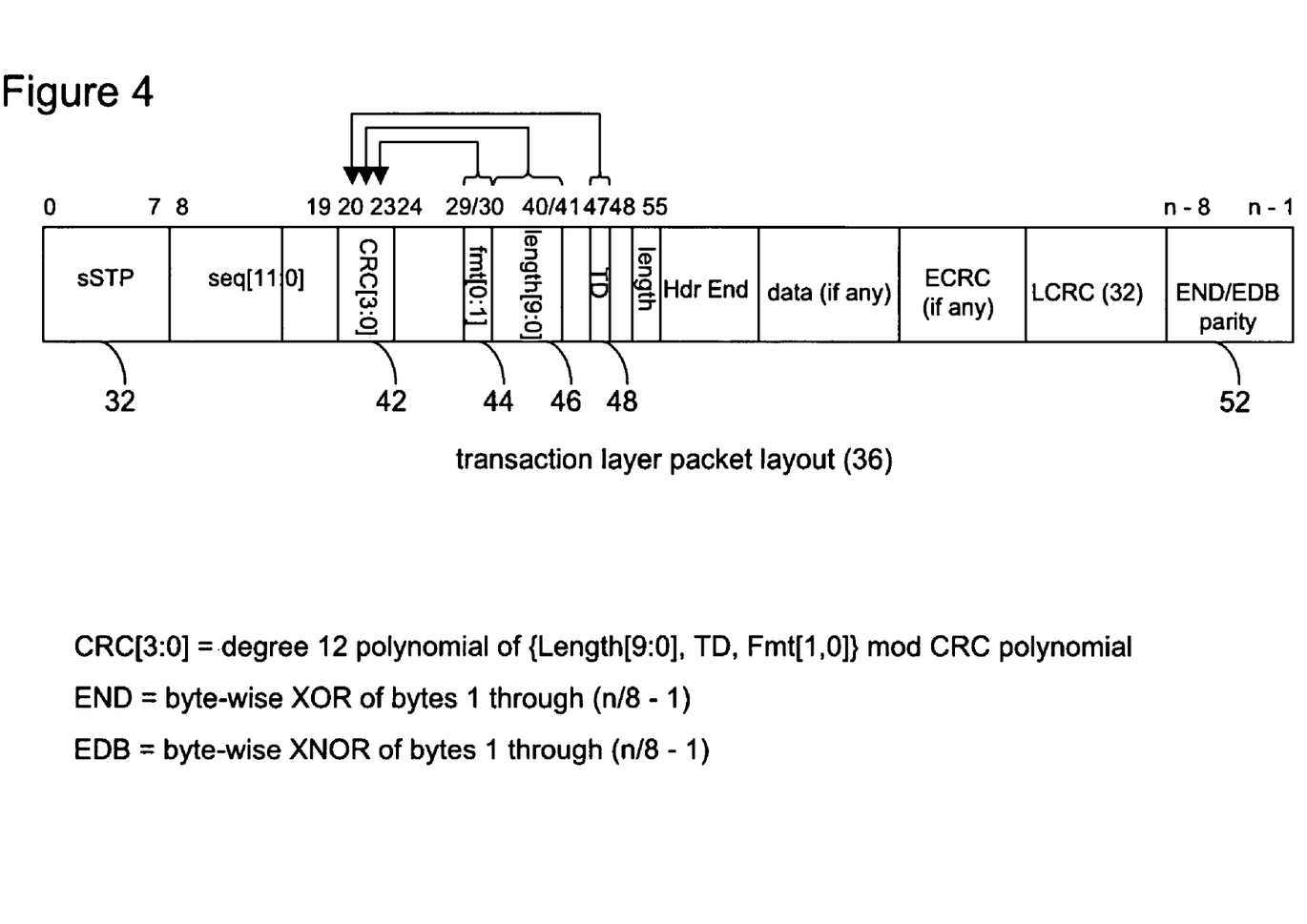
FIG. 4 is a block diagram of a transaction layer packet layout used by the encoding scheme of FIG. 1, according to some embodiments.

In some embodiments, if the receiver 50 detects a send transaction layer packet (STP), the receiver looks into subsequent bits with the next few bytes to figure out the length of the TLP. Since a TLP payload is of variable length, this computation helps determine the starting byte position (byte 0) for the next packet. FIG. 4 is a block diagram of a transaction layer packet layout 36, according to some embodiments. In PCIe, the length of the payload is a function of multiple fields: the length field 46 (length[9:0]), the format field 44 (fmt[1,0]), and the TLP digest (TD) field 48.

In some embodiments, the equation to get the length of the TLP payload in double-words is:

tlp_length[10:0]=(if *Fmt*[1] then Length[9:0]; else 0)+5 (for three double-word header, link level CRC, STP, and *END/EDB*)+(if *Fmt*[0] is 1 then 1; else 0) (denotes a four double-word header if 1)+(if TD is 1, then 1; else 0) (denotes end-to-end CRC)

The TLP fields, which are used to determine the payload length, are protected by a CRC field, depending on the desired error coverage, in some embodiments. Even though the packet itself may be CRC protected, bit errors in the fields that form the length can result in the packet boundary being terminated in the wrong byte such that the wrong bits would be taken as the CRC when the framing occurs. This can cause aliasing even if fewer errors than what the CRC can tolerate are obtained.

To avoid this problem, the encoder 100 employs a separate CRC protecting the fields that contribute to the length, in some embodiments. This separate CRC is located in a fixed bit position of the TLP, enabling the receiver 50 to retrieve the CRC each time. Thus, in this example, all the fields contributing to the length as well as the CRC covering them are in fixed positions.

In some embodiments, as depicted in FIG. 4, the encoder 100 defines the last four bits of byte three, which were previously reserved, for storing four bits 42 of CRC information. These bits (CRC[3:0]) 42 are used to store the CRC of the 13-bit field that includes length information of the transaction layer packet. Thus, the CRC bits 42 take a CRC of the two-bit format 44, the 10-bit length 46, and the one-bit TLP digest (TD) 48, as shown above, the information needed to compute the length of the TLP 36. The CRC[3:0] 42 stores a primitive polynomial of degree four to ensure that any number of errors within a 4-bit window will be detected. In other embodiments, more bits for CRC are used, for improved detection.

PCI Express defines a byte for END (or EDB for a bad packet) to signal the end of a packet. This is done so that the physical layer has a distinct delimiter to signal the end of a packet rather than having to look into the contents of the packet. The encoding scheme 100 also defines a byte for END/EDB to signal the end of the TLP 36. Thus, as shown in FIG. 4, the proposed transaction layer packet layout 36 includes eight bits at the end for the END/EDB parity byte 52.

In order to achieve better error coverage, the encoding scheme 100 employs the end byte position to send a byte-wise exclusive-OR (XOR) of all bytes in the transaction layer packet (byte one through n−2), n being the length of the packet in bytes), if the last byte is a good end (END). As the bytes are transmitted/received, they are stored in a memory of the respective transmitter 40/receiver 50, in some embodiments.

If, instead, the last byte is a bad end (EDB), due to a bad packet, a byte-wise exclusive-NOR (XNOR) of bytes one through n−2 is computed in the transaction layer packet 36. The receiver 50 does a byte-wise XOR of bytes one through n−1 in the transaction layer packet 36 (including the end byte position). A result of all zeroes signals a successful end from a physical layer perspective (the LCRC check will happen in the link layer and other transaction level checks will happen in the transaction layer). A result of all ones signals a successful EDB. Any other value indicates bit errors, such that a framing error is signaled and the link enters a recovery mode. Due to the byte-wise XOR, the encoder 100 provides an error detection of any number of bits within a 7-bit window. Since all ones is a valid encoding, the encoder 100 does not get the coverage for multiple bit errors within an 8-bit window. Those skilled in the art will recognize that the proposed END/EDB can be extended to any number of bits and can use any scheme, such as a CRC, instead of a byte-wise parity.

Figure 5:
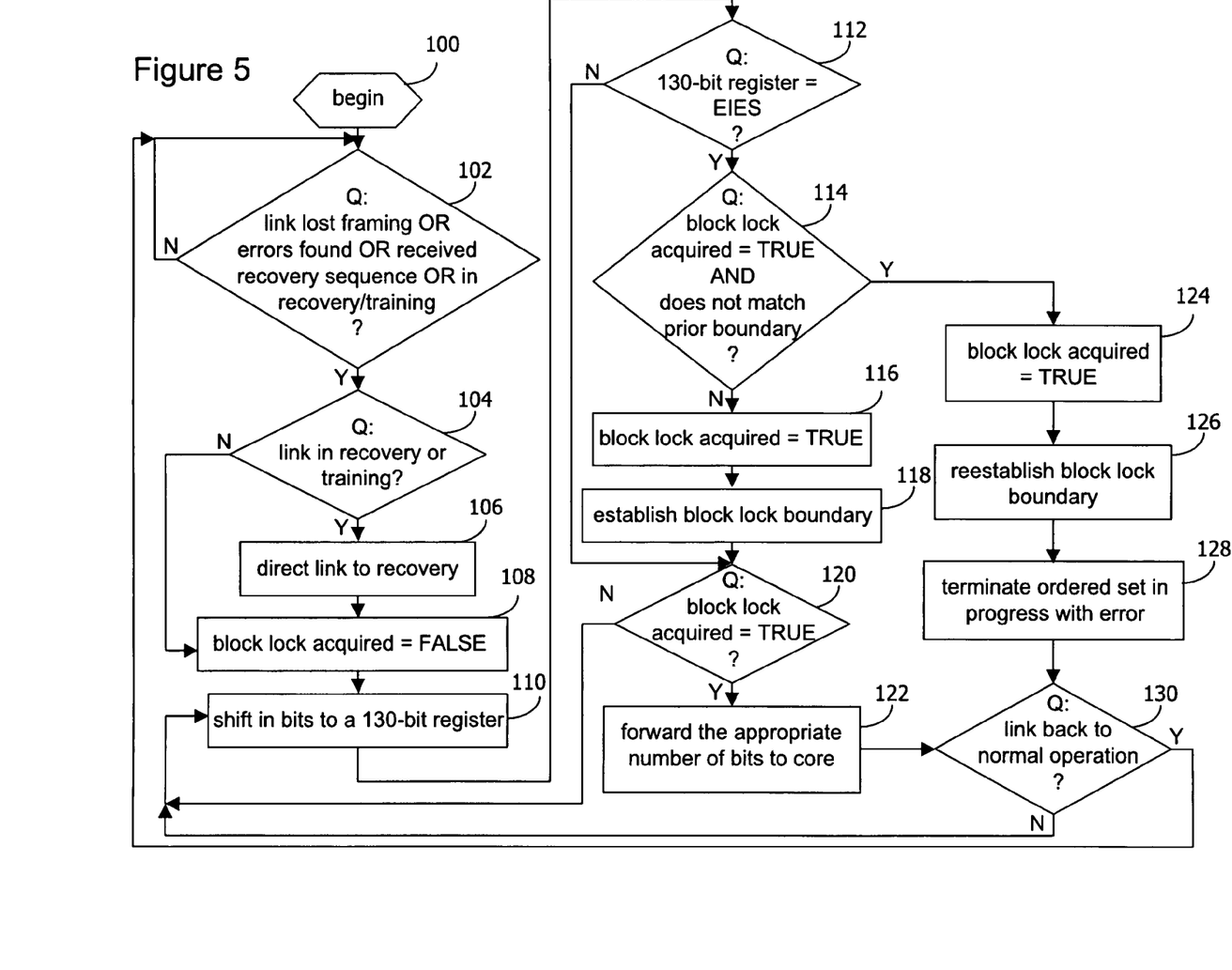
FIG. 5 is a flow diagram showing operations performed by the encoding scheme of FIG. 1 to obtain block lock, according to some embodiments.

FIG. 5 is a flow diagram showing the process of obtaining a block lock, according to some embodiments. The encoder 100 begins with a query to determine whether any of the following events occur: link lost framing, errors found, received recovery sequence, and in recovery/training (block 102). If not, no action is taken until one of the events does take place, at which point the encoder 100 determines whether the serial link 80 is in recovery or training (block 104). If so, a direct link to recovery is made (block 106). Direct link to recovery occurs when the link is lost. The receiver 50 goes to a recovery state, where it gains back the block lock and begins anew. Otherwise, no direct link to recovery is made.

In some embodiments, the receiver 50 uses a block lock acquired parameter to denote whether it has obtained block lock. At this point, the receiver 50 sets the block lock acquired parameter to FALSE (block 106). Next, the encoder 100 shifts in bits to a 130-bit register, such as the (130, 128) code 90 in FIG. 2 (block 110). This is used to obtain a block lock over the 130-byte field. If the 130-bit register looks for an electrical idle exit sequence (EIES) (block 112), then a check is made to ascertain whether the block lock acquired parameter is set to TRUE and the 130-bit register does not match the prior boundary (block 114). If the 130-bit register is not an EIES, the encoder 100 checks whether the block lock acquired parameter is set to TRUE only (block 120).

Where the block lock acquired is TRUE and the 130-bit register does not match the prior boundary (the "yes" prong of block 114), the block lock acquired parameter is set to TRUE (block 124), the block lock boundary is reestablished by the encoder 100 (block 126), and ordered sets which are in progress are terminated with an error (block 128).

Where either or both queries are not true (the "no" prong of block 114), the block lock acquired parameter is set to TRUE (block 116) and the block lock boundary is established (block 118). Next, a query is made whether the block lock acquired parameter is TRUE (block 120). If not, another shift in bits to a 130-bit register is made (block 110). If the block lock acquired parameter is TRUE (the "yes" prong of block 120), the appropriate number of bits is forwarded to the receiver (block 122).

After either the ordered set in progress is terminated with error (block 128) or the appropriate number of bits is forwarded to the receiver core 50 (block 122), a query is made whether to link back to normal operation (block 130). If so, the operations of the encoder 100 are repeated from the beginning (block 102). Otherwise, another shift in bits to a 130-bit register is made (block 110).

Figure 6:
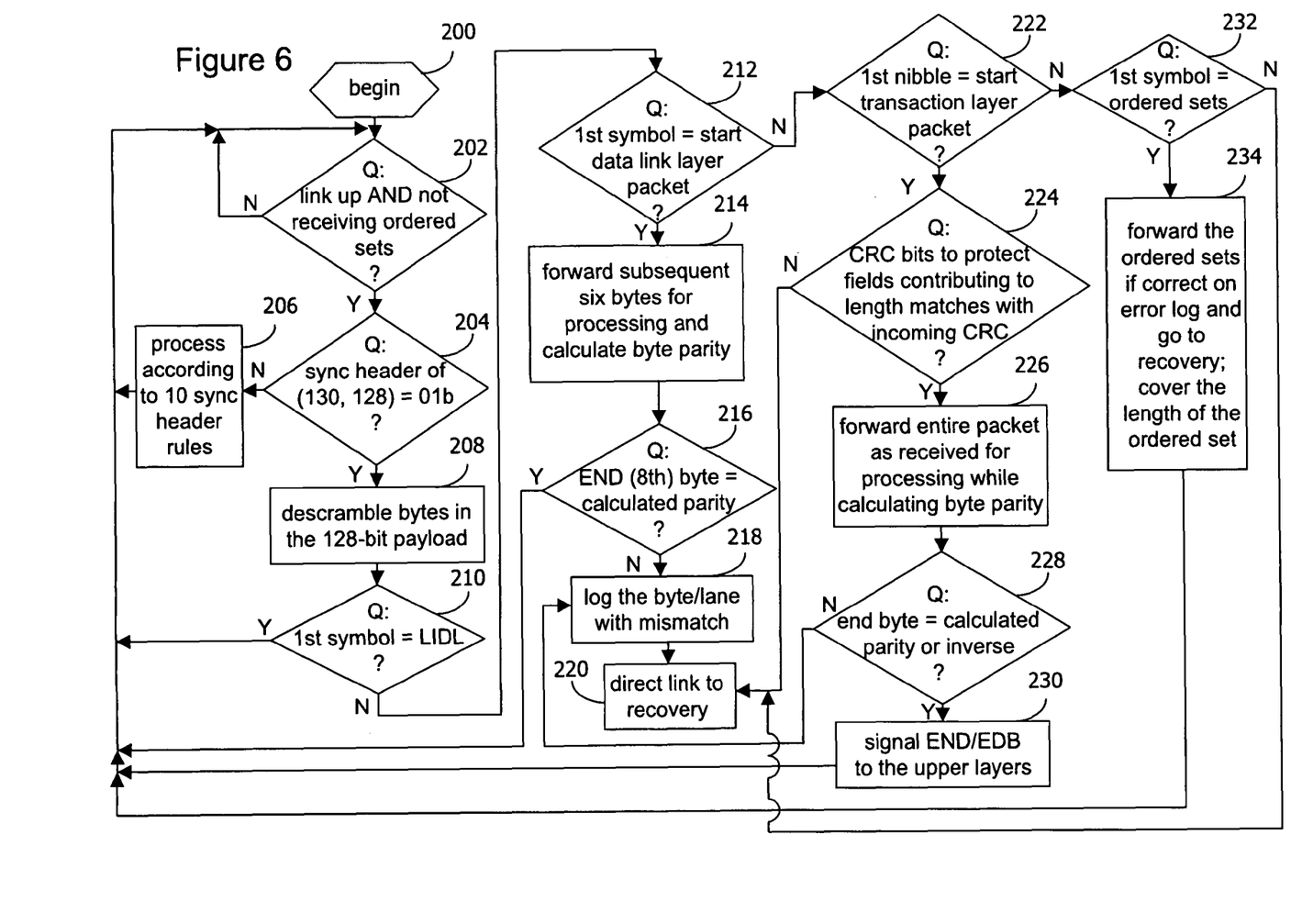
FIG. 6 is a flow diagram showing operations performed by the encoding scheme of FIG. 1 to process packets, according to some embodiments.

FIG. 6 is a flow diagram showing operation of the encoder 100 within the system 200 (FIG. 1) to process a transaction layer packet, according to some embodiments. While FIG. 5 showed the process of obtaining a block lock, whether recovering from an error or just starting, FIG. 6 shows regular packet handling after the block lock has been established, with the link 80 carrying transactions. The flow diagram depicts operations at the receiver 50 (FIG. 1) to process packets coming from the transmitter 40 in the system 200. The process does not begin until the link is up and no ordered sets are being received (block 202). Once this is so, the sync header 22 is read to determine if it is a 01b (block 204). Recall that when the (130, 128) code 90 comes with a prefix of 01b, payloads such as logical IDL, transaction layer packets, and ordered sets. If the sync header 22 is not an 01b, but a 10b, the packet is an ordered set and is processed as described above (block 206). Otherwise, the remaining 128 bits (16 bytes) 24 are descrambled (block 208).

Next, a query is made whether the first symbol of the 128 bits 24 is a logical IDL (LIDL) (block 210). If so, there is no further processing, so the encoder 100 proceeds back to the beginning (block 202). If the first symbol is not an LIDL, a new query asks whether the first symbol is the start of a data link layer packet (DLLP) (block 212). If so, the next six bytes are forwarded for processing and the byte parity is calculated (block 214). Recall that DLLP packets have a fixed length of eight bytes. As such, the end byte is always the eighth byte. Accordingly, the eighth byte is checked to see whether it matches the calculated parity of the DLLP (block 216). If so, the processing is complete and control proceeds back to the beginning (block 202).

Where the calculated parity does not match the value stored in the eighth byte (the "no" prong of block 216), the byte/lane with the mismatch is logged (block 218), and a direct link to recovery is made (block 220).

If the first symbol is not the start of a DLLP (the "no" prong of block 212), the encoder 100 determines whether the first nibble is the start of a transaction layer packet (TLP) (block 222). If so, the encoder 100 obtains the CRC bits 42 from the TLP layout 36 (FIG. 4) and compares the 4-bit value with the value obtained in the format field 44, the length field 46, and the TLP digest field 48 (block 224). If there is a match, the entire packet is forwarded as received for processing while the encoder 100 calculates the byte parity (block 226). Otherwise, a direct link to recovery is made (block 220). Once the parity is calculated, it is compared to the value stored in the end byte of the 128-bit sequence (block 228). If the end byte equals the calculated parity, the last byte constitutes a valid END byte (block 230). If the end byte is an inverse of the calculated parity, a bad END (EDB) is found (block 230). If the end byte is neither the calculated parity or its inverse, the processing for that sequence is ended and control proceeds back to the beginning (block 202).

If the first nibble is not the start of a TLP (the "no" prong of block 222), the encoder 100 determines whether the first symbol denotes ordered sets (block 232). If so, the ordered sets are forwarded if they have the correct format. Otherwise, an error is logged and the link is directed to go to recovery (block 234). If the first symbol is not ordered sets (the "no" prong of block 232), it indicates the first symbol is not one of the four types (Logical IDL, TLP, DLLP, Ordered Set), then the link is directed to (block 220).

Figure 7:
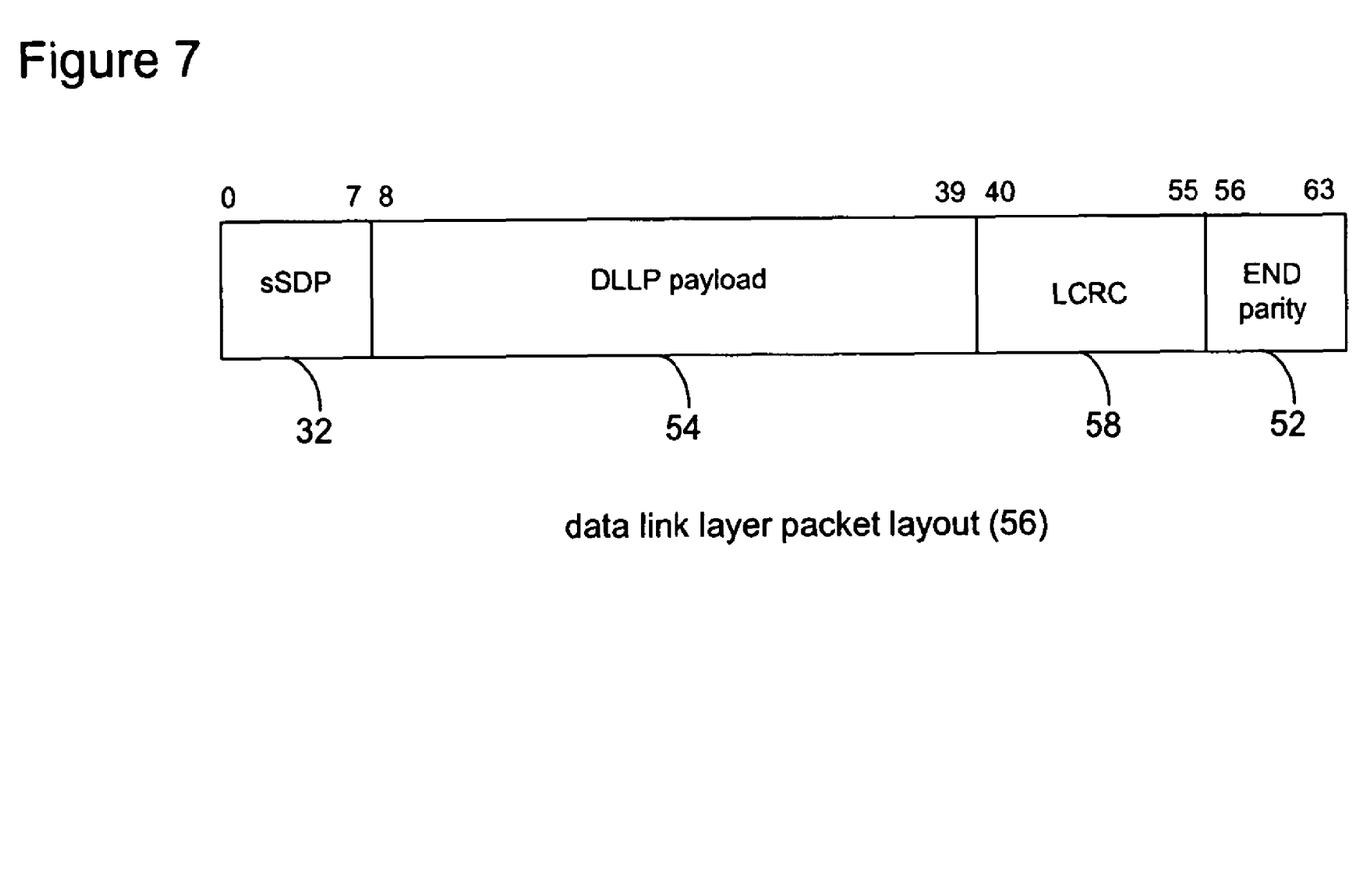
FIG. 7 is a block diagram of a data link layer packet layout used by the encoding scheme of FIG. 1, according to some embodiments.

FIG. 7 is a block diagram depicting a data link layer packet layout 56, according to some embodiments. The DLLP 56 is a fixed length payload of eight bytes. Accordingly, following the first 8-bit payload type symbol 32, which indicates the payload type (sSDP), the DLLP payload 54 is stored in the next four bytes, the LCRC 58 in the next sixteen bits, and the END parity byte 52 is in the last byte. For a data link layer packet (DLLP) payload, the same XOR rules on the END parity byte 52 apply. Thus, a byte-wise XOR of all bytes in the DLLP 56 is taken. Since data link layer packets do not have an EDB, all ones in the receivers' XOR is also deemed an error. Thus, for a DLLP payload 56, the encoder 100 may tolerate any number of bit errors in an 8-bit window.

In some embodiments, the encoder 100 offers guaranteed detection of bit errors within a window of four bits (if the length fields get impacted) and, for the rest of the packet payload, within a window of seven bits. Detection of ordered set errors is not described here. In some embodiments, the encoder 100 uses a separate byte for parity, if needed. However, since ordered sets can tolerate multiple bit errors due to inbuilt error detection in the protocol (lots of repetition) and since multiple bit errors do not impact the data consistency, it is not needed for ordered sets, but can be useful for transaction or data link layer packets. This would be extremely useful for implementations using discrete Fourier equalizers. Guaranteed detection of multiple bit flips within a given window is a new capability that gets added because of this approach.

In some embodiments, the encoder 100 optimizes the time it takes to exit a low power state, such as L0s, by sending unscrambled patterns that are not (130, 128) encoded. (L0 is a normal operating state, where packets are transmitted and received; L0s is a power savings state, where quick entry back to the L0 state is possible without having to go through link recovery.)

Figure 8:
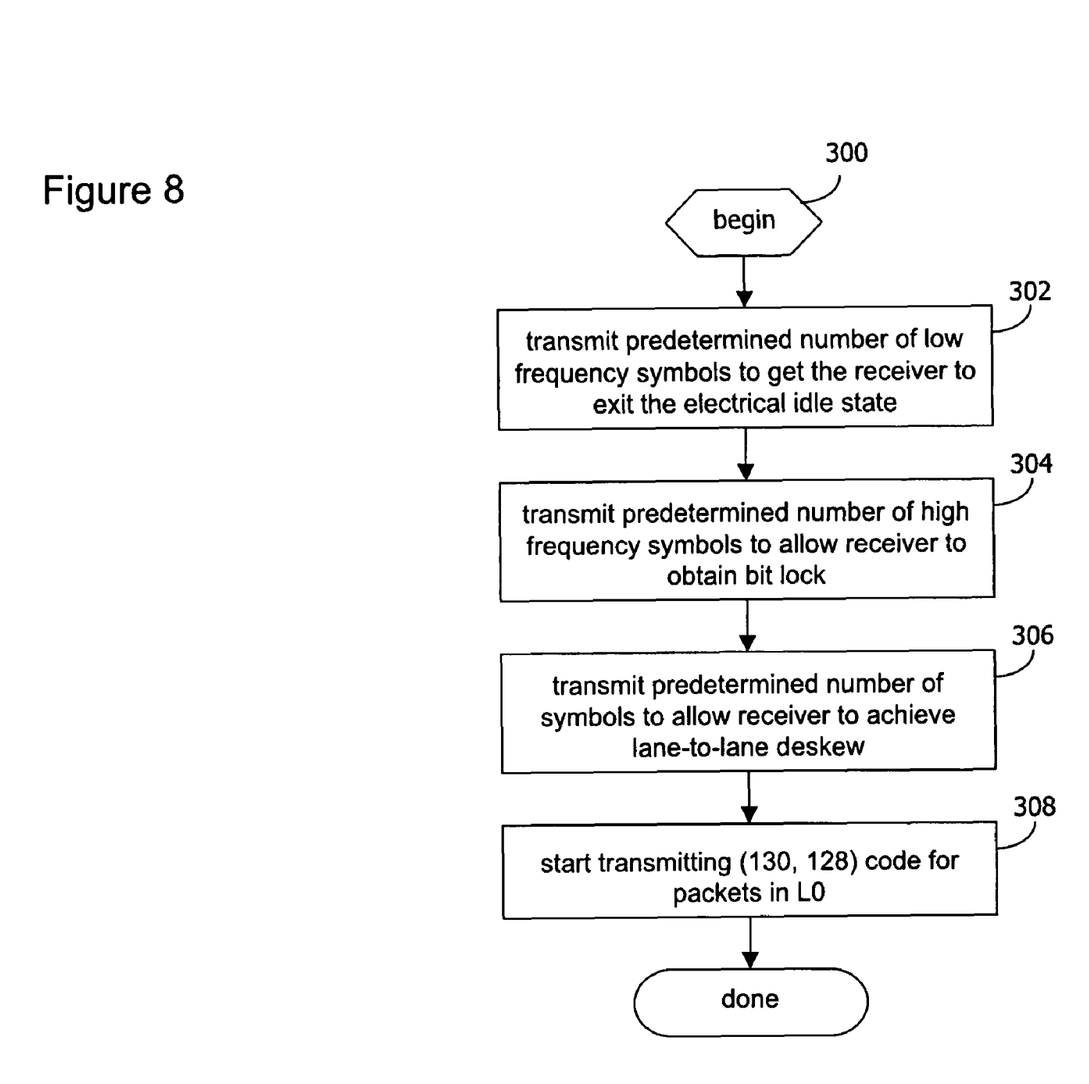
FIG. 8 is a flow diagram showing enhanced operations performed by the encoding scheme of FIG. 1 prior to processing packets, according to some embodiments.

FIG. 8 is a flow diagram showing the operations performed by the encoder 100, according to some embodiments. First, the encoder 100 sends a predetermined number of low frequency patterns (as in PCI Express 2.0) such as eight zeroes followed by eight ones, repeated four to eight times (or as needed) (block 302). This helps the receiver 50 exit the electrical idle state. Then, the transmitter 40 sends the number of high-frequency fast training sequences (FTS) the device had requested during link negotiation (block 304). The FTS can be a combination of special symbols (e.g., each FTS can be a 10110010 followed by three 10101010). The high-frequency component helps acquire bit lock, while the first symbol can be used to achieve the byte lock. At the end, the encoder 100 transmits a predetermined number of symbols to achieve lane-to-lane de-skew (such as 11000011) (block 306).

After acquiring the symbol lock, the receiver 50 looks for the de-skew pattern to de-skew between lanes of the serial link 80. After the second de-skew, the (130, 128) code 90 may commence (block 308). Removing the (130, 128) code 90 without scrambling to get the link operational is more efficient in transmitting predetermined patterns than sending periodic sequences of a low frequency pattern to exit the electrical idle, followed by high frequency patterns to achieve bit and symbol lock and a separate set for performing lane-to-lane de-skew, all embedded within a (130, 128) code 90 and getting scrambled. The scrambler 30/descrambler 70 are reset during L0s and start working with the first (130, 128) code 90. The flow diagram 300 demonstrates how these separate transactions are performed by the encoder 100, in some embodiments, to exit the electrical idle state, to obtain bit lock, and to achieve lane-to-lane deskew, before transmitting normally, e.g., in the L0 power state.

A different issue that may arise with a scrambling only approach is known as the killer packets. If a particular bit pattern can cause errors, and a TLP or DLLP packet happens to have that pattern after scrambling following the first trip through the recovery phase, the encoder 100 ensures that the problematic bit pattern does not repeat on subsequent retransmissions, in some embodiments. This approach will avoid any virus causing the link to go down. In every trip through recovery, with every EIES sequence, the scrambler 30 (descrambler 70) gets reset to a seed value. Resetting the scrambler 30 (descrambler 70) during the recovery phase is needed as the descrambler 70 may be out of synchronization with the transmitter 40, due to errors such as bit slip. However, the downside of this scrambler synchronization is the potential of the same TLP packet 36 coming out with the identical bit stream every time through the recovery phase. If that bit pattern is a killer bit pattern, the bit pattern can repeatedly cause problems such as bit errors.

To avoid such problems, the encoder 100 sends a random number of special IDLE symbols in L0 before sending the first TLP 36 coming out of the recovery phase, in some embodiments. The exact formula for the number of special IDLE symbols is implementation-dependent, in some embodiments, and could change from run to run depending on various factors. The effect of multiple factors makes it difficult to characterize the expected number with every trip through the recovery phase.

While the application has been described with respect to a limited number of embodiments, those skilled in the art will appreciate numerous modifications and variations therefrom. It is intended that the appended claims cover all such modifications and variations as fall within the true spirit and scope of the invention.

I claim:

1. A system, comprising:
a receiver comprising an decoder; and
a serial link coupling a transmitter to the receiver, wherein a code received across the serial link by the receiver, the code comprising:
a two-bit prefix comprising one of two valid states; and
a sequence of predetermined bit length;
the two-bit prefix further comprising either a first valid state or a second valid state, wherein:
the first valid state indicates that the code is an electrical idle entry sequence or an electrical idle exit sequence, and the sequence of predetermined bit length comprises a repeating pattern; and
the second valid state indicates that the first byte of the sequence of predetermined bit length comprises a payload type symbol;
wherein the code enables the receiver to identify incoming data.

2. The system of claim 1, wherein the receiver uses the code as a training sequence, enabling the receiver to synchronize with the transmitter.

3. The system of claim 1, wherein the payload type symbol indicates that the payload is either an idle payload, a transaction layer packet payload, a data link layer packet payload, or an ordered sets payload.

4. The system of claim 1, the payload type symbol indicating a transaction layer packet payload, wherein the transaction layer packet further comprises:
one or more length fields; and
a CRC field, the CRC field occupying a fixed location of the transaction layer packet, wherein the CRC field comprises a cyclic redundancy check of the one or more length fields;
wherein the receiver confirms the one or more length fields with the CRC field before calculating the length of the transaction layer packet using the one or more length fields.

5. An encoding scheme, comprising:
receiving a code by a receiver through a serial link, the code comprising:
a two-bit prefix; and
a sequence of predetermined bit length;
wherein the code enables the receiver to synchronize with a transmitting device coupled to the serial link;
obtaining a block lock by the receiver; and
reading a payload type symbol if the two-bit prefix has a first predetermined value, wherein the payload type symbol occupies a first byte of the sequence of predetermined bit length;
wherein the code comprises an electrical idle entry signal or an electrical idle exit signal when the two-bit prefix has a second predetermined value.

6. The encoding scheme of claim 5, reading a payload type symbol further comprising:
retrieving the payload type symbol, wherein the symbol indicates an idle payload; and
performing no further processing of the code.

7. The encoding scheme of claim 5, reading a payload type symbol further comprising:
retrieving the payload type symbol, wherein the symbol indicates a data link layer packet;
calculating a byte parity of the sequence of predetermined bit length;
forwarding six subsequent bytes for processing; and
comparing the calculated byte parity with a last byte of the sequence of predetermined bit length, wherein an error is logged if the byte parity and the last byte are not the same.

8. The encoding scheme of claim 5, reading a payload type symbol further comprising:
retrieving the payload type symbol, wherein the symbol indicates a transaction layer packet;
retrieving length bytes of the transaction layer packet, the length bytes being at a predetermined location in the sequence of predetermined bit length; and
comparing the retrieved length bytes to a plurality of cyclic redundancy check bits according to a formula, the plurality of cyclic redundancy check bits being disposed in a second predetermined location of the sequence of predetermined bit length, to produce a result;
wherein a length of the transaction layer packet is obtained from the length bytes when the result is zero.

9. The encoding scheme of claim 8, comparing the retrieved length bytes to a plurality of cyclic redundancy check bits according to a formula further comprising:
using a predetermined formula to calculate a length of the transaction layer packet.

10. The encoding scheme of claim 5, further comprising:
transmitting a predetermined number of low-frequency symbols to get the receiver to exit an electrical idle state;
transmitting a second predetermined number of high-frequency symbols to allow the receiver to obtain bit lock;
transmitting a third predetermined number of symbols to allow the receiver to perform lane-to-lane deskew;
wherein the receiver is recovering from a low power state.

11. A system, comprising:
a receiver comprising an decoder; and
a serial link coupling a transmitter to the receiver, wherein a code received across the serial link by the receiver, the code comprising:
a two-bit prefix comprising a first value and a second value, wherein:
the first value indicates either an electrical idle exit sequence or an electrical idle entry sequence; and
the second value indicates either an idle sequence, a data link layer packet, or a transaction layer packet; and
a sequence of predetermined bit length, the sequence comprising unique bits based on the value of the two-bit prefix;
wherein the code enables the receiver coupled to one end of the serial link to synchronize with the transmitter coupled to another end of the serial link.

12. The system of claim 11, the two-bit prefix comprising the first value and the sequence of predetermined bit length comprising a repeating sequence of ones and zeroes, wherein the two-bit prefix and the sequence of predetermined bit length are not scrambled and are used to identify a block boundary for subsequent processing and to validate and reidentify the block boundary when needed.

13. The system of claim 12, wherein the sequence of predetermined bit length is sent at a low frequency such that the receiver can exit a low-power state.

14. The system of claim 12, wherein the sequence of predetermined bit length causes the receiver to reset a linear feedback shift register.

15. The system of claim 11, wherein the two-bit prefix comprises the second value, a first byte of the sequence of predetermined bit length further comprising a payload type symbol, wherein the receiver processes the sequence of predetermined bit length according to the payload type symbol.

16. The system of claim 15, the payload type symbol further indicating an idle payload, wherein the receiver takes no further action.

17. The system of claim 16, the payload type symbol further indicating a data link layer packet, wherein the remaining bytes of the code comprise six bytes to be processed and one parity byte.

18. The system of claim 16, the payload type symbol further indicating a transaction layer packet, wherein the remaining bytes of the code comprise:

two bits of format information;
ten bits of length information;
one bit of digest information, wherein the format, length, and digest information together provide a length of the transaction layer packet; and
a plurality of CRC bytes, the CRC bytes to be compared to the length of the transaction layer packet before processing of the transaction layer packet by the receiver.

* * * * *